Dec. 8, 1936. G. A. F. WINCKLER 2,063,070
GENERATOR
Filed Feb. 26, 1934    2 Sheets-Sheet 1
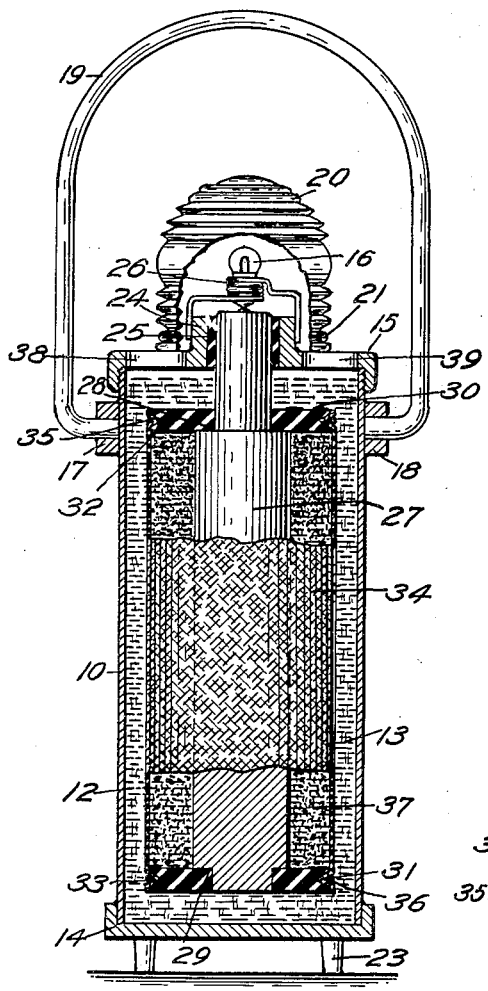
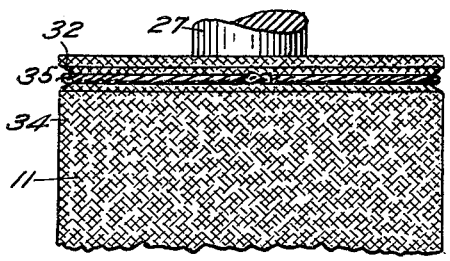
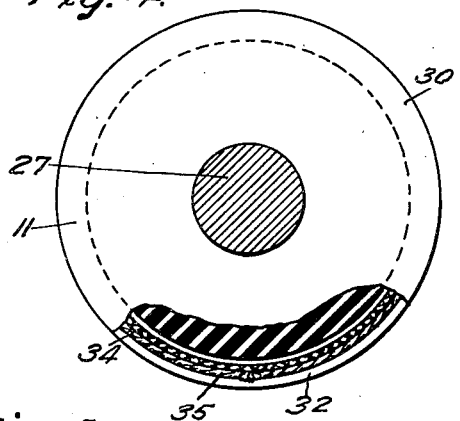
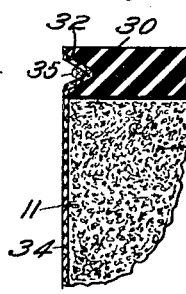
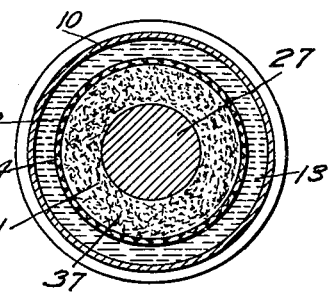
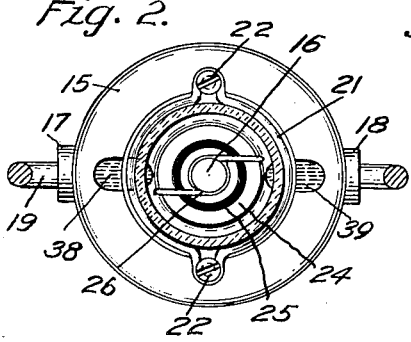
Inventor,
Gunnar A. F. Winckler,
by Frank G. Hattie,
Attorney.

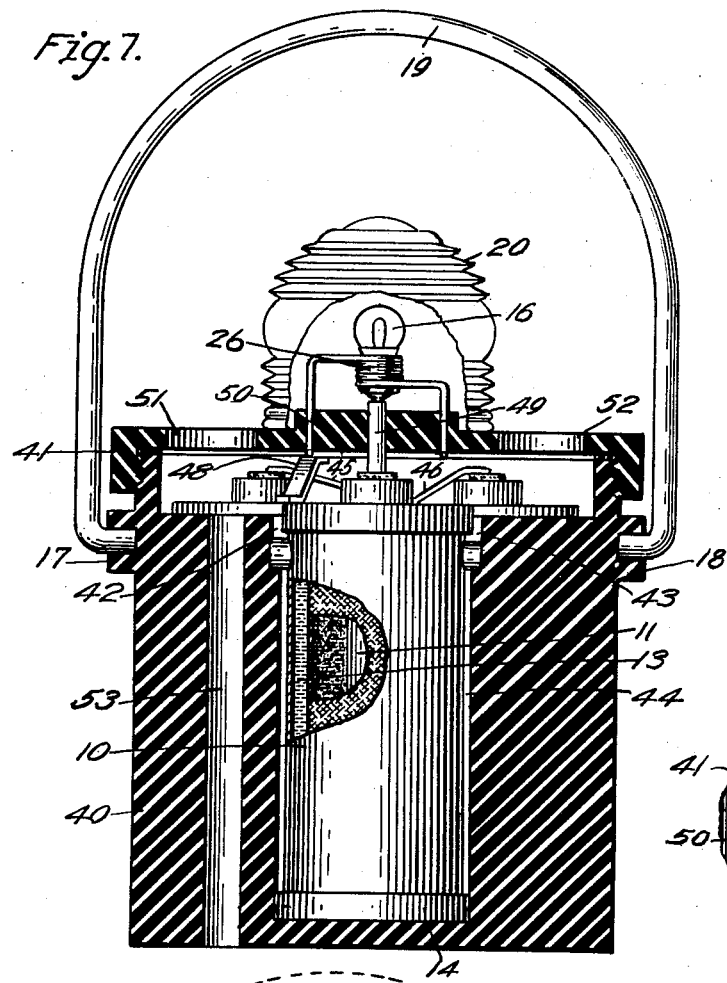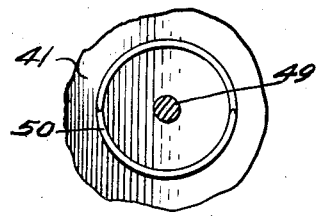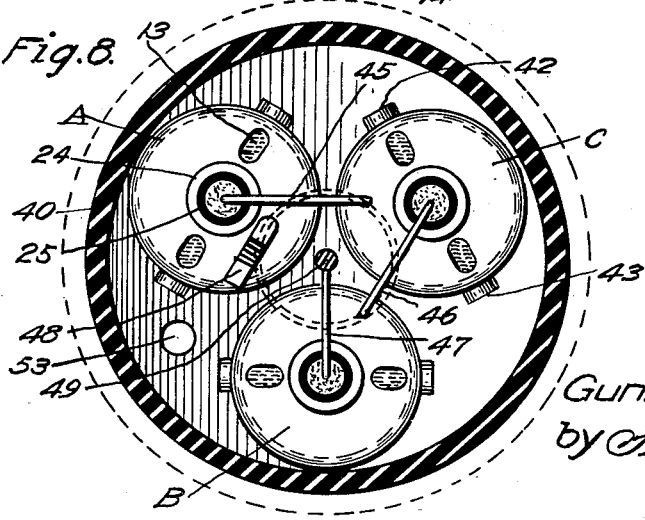

Patented Dec. 8, 1936

2,063,070

UNITED STATES PATENT OFFICE 2,063,070

GENERATOR

Gunnar A. F. Winckler, Worcester, Mass., assignor to Winckler Engineering Laboratories Incorporated, Boston, Mass., a corporation of Massachusetts Application February 26, 1934, Serial No. 712,909

4 Claims. (Cl. 136—100)

The invention consists of an electric generator connected to an electric circuit and lamp especially adapted for lanterns, having a zinc casing which serves as a negative electrode of the generator, and a positive electrode construction with a free space between them which allows the electrodes to be immersed in saline solution for generating current to energize the electric circuit and lamp. The electrolyte is the removable link of the generator which allows the generator to be immersed in saline solution to generate current for the lamp and when the electrolyte is removed, it disconnects the electrodes of the generator which prevents any action between them and will maintain infinite shelf-life and automatically depolarize by aeration.

The invention further consists of details of construction including a special casing adapted to receive a plurality of generating cells by adapting the cells to the casing. The casing and cells are provided with holes for admitting and removing electrolytic fluid and also a drain for removing the surplus electrolytic fluid during the filling operation, which would destroy the unitary function of the generator.

The object of the invention is to provide a novel generator structure of sufficient power within a limited space. Another object of the invention is to provide a means for admitting the electrolytic fluid to the generator when needed and removing when not in use.

Further objects of the invention are to provide a casing for holding several individual cells which would increase the voltage of the current supplied by the electrolytic fluid and renewed at will and at the same time allow the electrolytic fluid to be drained off so it will not destroy the unitary action of the generator.

Referring to the figures:—

Fig. 1 is a front elevation of the generator with the container in section showing the improved construction.

Fig. 2 is a plan view of the container with the lens in section.

Fig. 3 is a partial elevation of the positive pole member showing the cloth holder secured in position.

Fig. 4 is a plan view of the same.

Fig. 5 is a fragmentary view of the positive pole construction.

Fig. 6 is a cross-section through the container.

Fig. 7 is an elevation of the generator with the three units in position.

Fig. 8 is a cross-section of the casing above the units.

Fig. 9 is a partial inverted plan view of the cover with the circular conductor in position.

Referring to the drawings which illustrate the novel construction for electrical generators, especially adapted for riding-lights commonly used on boats. The electrical generator "A" is provided with a container 10 made of zinc which serves as a negative pole. Concentric with the casing 10 is a positive pole 11 having a free space 12 between them to allow both poles to be immersed in the electrolytic fluid 13 when the container 10 is filled with saline solution or waters of the seas.

The casing 10 is provided with a bottom 14 and a cover 15, the latter being adapted to support the positive pole and the lamp 16. Formed integral with the casing 10 are lugs 17 and 18 in which the handle 19 is supported for carrying or supporting the generator. The cover 15 also supports the lens 20 for diffusing the light from the lamp 16. The lens 20 is held rigidly in position on the cover 15 by a clamp 21 which in turn is secured in position by the screws 22.

The generator is supported by the legs 23. When the unit is used otherwise, the legs are not used. The structure without the legs and handle is a generating cell of which several of them can be placed in series to increase the volume of current, but when used singly the handle 19 and the legs 23 complete the structure.

Formed integral with the cover 15 is an annular sleeve 24 which is lined with an insulating sleeve 25. The sleeves serve as a bearing for supporting the positive pole 11 and insulate it from the negative pole 10. The lamp 16 is supported in the socket 26 made of convolutions of wire, the ends of which are directly secured to the covers 15 and 41 both of which are connected into the electrical circuit. The bottom part of the lamp is in contact with the positive pole and the negative pole is connected to the lamp and forms a circuit for lighting the lamp. The positive pole is provided with a central column 27 having shoulders 28 and 29 at both ends which makes them smaller in diameter. The upper end is securely fastened to the cover 15 and supports the whole positive pole structure.

Secured in and resting on the shoulders 28 and 29 of the column 27 are the discs 30 and 31 made preferably of insulating material, because no other material could be used without interfering with the electrical operation of the generator.

Formed in the edges of the discs 30 and 31 are grooves 32 and 33 adapted to receive the edges of the cloth bag 34 which is tied to the discs 30 and 31 by strings 35 and 36, the whole structure insures that the ground carbon 37 will be held securely in position against the action of the electrolytic fluid. The ground carbon increases the polarization area of the negative electrode due to the fact that the electrolyte is permitted to flow through it which insures a maximum polarization area within a minimum space with a corresponding depolarization area.

The ground carbon dissipates the hydrogen in the electrolytic fluid to increase the polarization of the positive pole and also increase the rate of speed of depolarization. By using ground carbon an immersed area of polarization and depolarization is obtained to give a maximum power in a minimum space.

Formed in the cover 15 are holes 38 and 39 which allow the container to be filled with saline solution or waters of the seas at the will of the operator. For example: If the lantern is used for a riding-light on boats, it is let down into the waters of the seas and filled with the fluid which will light the lamp, after which it is hung in the rigging as a warning light. When it is taken down the electrolytic fluid is emptied out of the container which releases all strain on the generator which is always accessible without due work or attention with an assured maximum light-life by increasing the polarization and depolarization area and an infinite shelf-life as a result of the free space allowing aeration making the lantern always ready for instant use.

These generating units can be used singly or in numbers. The drawings show in Figs. 7 and 8 three units "A", "B", and "C" and are mounted in a separate container 40 made of insulating material which completely separates the units electrically. The container 40 is provided with a cover 41 located in position. Supported on the cover 41 is a lamp 16 and the lens 20 which are supported on the cover in the same manner as they are secured to the individual units, and the several generators are connected in series to the lamp. The container is provided with lugs 17 and 18 the same as the individual units for pivotedly supporting the handle 19. The lugs 17 and 18 forming a part of the individual units rest in the recesses 42 and 43 formed in the casing which permits the generators to always register in the same position. The recesses 42 and 43 open into the chamber 44 in which is located the units "A", "B", and "C" and are connected in series by the wires 45, 46, and 47. The wires in turn are connected to the spring contact 48 and contact post 49. The spring contact 48 wipes against the contact member 50 forming a part of the lamp socket 26. The lamp socket is made of wire in helical convolutions, the ends of which extend through the cover 40 and are bent back in circular form to allow the cover to be placed in position with the surety that the lamp circuit will always be connected up. In other words, no matter in which position the cover is in, the contacts will always be in position.

The contact post 49 is also supported in the cover 41 and when it is placed in position, the post 49 will be connected up to the positive pole member, thereby completing the electrical circuit to the lamp 16. The lamp 16 always remains on the cover structure and can be readily placed in position or taken off should the condition require it.

The cover 41 is provided with holes 51 and 52 to allow the electrolytic fluid to enter the container to be distributed to the several electric units "A", "B", and "C" in the usual manner. The unit under conditions known as shelf-life has no electrolytic action and is free from deterioration because no current is generated, due to the fact that there is no electrolytic fluid in the generator. When it is used the container is dipped in the waters of the seas, or filled with saline solution which generates the current and lights the lamp. When several units are used they must be separated electrically to increase the volume of the current by connecting the several generators in series to each other, all of which are connected to the lamp circuit. When the lantern with the several units are used the dipping process is the same until all the units are filled with electrolytic fluid which would flood the space above them and destroy their function. To obviate this, a drain passage 53 is provided which allows the surplus fluid to pass off thereby separating each unit from the others.

In operation the generator is filled with electrolytic fluid which completes the current generating process and the generator will provide light for approximately eighteen hours. When the fluid is taken out of the generator it will be regenerated by aeration which gives infinite shelf-life in intermittent service limited only by the weight of the zinc used in construction. This is also the function of the multi-generating structure which is provided with a draining unit for allowing the individual function of each unit.

What I claim as new and desire to secure by Letters Patent in the United States is:

1. A method of controlling and energizing a voltaic cell circuit, which circuit includes a simple voltaic cell consisting of a container and having fixed electrodes and having a free space between said electrodes intended to eliminate switches and a translating element permanently and directly connected electrically to the electrodes of the cell, consisting of the steps of energizing the circuit at will by filling the container from the exterior, without disturbance of the relative parts of the apparatus, with a fresh liquid electrolyte, and deenergizing and breaking the circuit at will by emptying the electrolyte from the container without disturbance of the relative parts of the apparatus, removal of the electrolyte being accompanied by the elimination of the electro-potential gradient between the electrodes, energization of the circuit being attended by at least partial polarization of the cell, and exposing the electrodes to air following removal of the electrolyte from the cell to depolarize said electrodes, whereby, by virtue of this control there is obtained an infinite shelf-life to the source of energy for the circuit.

2. A method of controlling and energizing a voltaic cell circuit, which circuit includes a simple volatic cell consisting of a container and having fixed electrodes and having a free space between said electrodes intended to eliminate switches and a translating element permanently and directly connected electrically to the electrodes of the cell, consisting of the steps of energizing the circuit at will by filling the container from the exterior, without disturbance of the relative parts of the apparatus, with a fresh saline solution, and deenergizing and breaking the circuit at will by emptying the saline solution from the container without disturbance of the relative parts of the apparatus, removal of the saline solution being accompanied by the elimination of the electro-potential gradient between the electrodes, energization of the circuit being attended by at least partial polarization of the cell, and exposing the electrodes to air following removal of the saline solution from the cell to depolarize said electrodes, whereby, by virtue of this control there is obtained an infinite shelf-life to the source of energy for the circuit.

3. A primary cell having an electrolytic link removable and replaceable at will and consisting solely of a casing serving as a negative electrode and capable of retaining a liquid and having an impervious bottom, a top for said casing, a positive electrode within and spaced in insulated manner from said casing in such manner as to provide a free space therebetween, said assembly of casing and top having at least one opening therein disposed above the bottom end of said positive electrode, and a liquid electrolyte in said casing which may be poured into or out of said casing through said opening at will simply by tipping the container to energize or de-energize the cell, and to depolarize the cell by aeration as an incident to the removal of the electrolyte, the removability of the electrolyte permitting infinite shelf-life of the cell.

4. A primary cell having an electrolytic link removable and replaceable at will and consisting solely of a casing serving as a negative electrode and capable of retaining a liquid and having an impervious bottom, a top for said casing, a positive electrode within and spaced in insulated manner from said casing in such manner as to provide a free space therebetween, said assembly of casing and top having at least one opening therein disposed above the bottom end of said positive electrode, and a saline solution in said casing which may be poured into or out of said casing through said opening at will simply by tipping the container to energize or de-energize the cell, and to depolarize the cell by aeration as an incident to the removal of the saline solution, the removability of the saline solution permitting infinite shelf-life of the cell.

GUNNAR A. F. WINCKLER.